United States Patent
Sandstrom

(10) Patent No.: US 7,349,414 B2
(45) Date of Patent: Mar. 25, 2008

(54) SYSTEM AND METHOD FOR MAXIMIZING THE TRAFFIC DELIVERY CAPACITY OF PACKET TRANSPORT NETWORKS VIA REAL-TIME TRAFFIC PATTERN BASED OPTIMIZATION OF TRANSPORT CAPACITY ALLOCATION

(75) Inventor: Mark Henrik Sandstrom, San Francisco, CA (US)

(73) Assignee: Optimum Communications Services, Inc., Edmonton, AB (CA)

(*) Notice: Subject to any disclaimer, the term of this patent is extended or adjusted under 35 U.S.C. 154(b) by 983 days.

(21) Appl. No.: 09/938,014

(22) Filed: Aug. 24, 2001

(65) Prior Publication Data

US 2003/0048797 A1   Mar. 13, 2003

(51) Int. Cl.
*H04L 12/28* (2006.01)
(52) U.S. Cl. .................. 370/406; 370/258; 370/252
(58) Field of Classification Search ........ 370/229–238, 370/254–258, 468, 477
See application file for complete search history.

(56) References Cited

U.S. PATENT DOCUMENTS

| | | | |
|---|---|---|---|
| 4,587,651 A | 5/1986 | Nelson et al. | |
| 6,108,306 A | 8/2000 | Kalkunte et al. | |
| 6,157,656 A | 12/2000 | Lindgren et al. | |
| 6,195,332 B1 * | 2/2001 | Tang | 370/232 |
| 6,246,692 B1 * | 6/2001 | Dai et al. | 370/438 |
| 6,542,511 B1 * | 4/2003 | Livermore et al. | 370/406 |
| 6,556,548 B1 * | 4/2003 | Kirkby et al. | 370/322 |
| 6,631,128 B1 * | 10/2003 | Lemieux | 370/351 |
| 6,667,956 B2 * | 12/2003 | Beshai et al. | 370/238 |
| 6,697,373 B1 | 2/2004 | Sandstrom | |
| 6,741,572 B1 * | 5/2004 | Graves et al. | 370/254 |
| 6,813,277 B2 | 11/2004 | Edmon et al. | |
| 6,826,160 B1 | 11/2004 | Wang et al. | |
| 6,973,504 B2 * | 12/2005 | Nomura | 709/235 |
| 7,042,892 B2 | 5/2006 | Young et al. | |
| 2005/0174948 A1 | 8/2005 | Isonuma | |
| 2006/0182144 A1 | 8/2006 | Dove | |
| 2007/0053369 A1 | 3/2007 | Mizutani | |

* cited by examiner

*Primary Examiner*—Wing Chan
*Assistant Examiner*—Michael J. Moore
(74) *Attorney, Agent, or Firm*—Fenwick & West LLP

(57) ABSTRACT

A system and method for maximization of the global throughput of packet transport networks via traffic-load-adaptive TDM or WDM channelization. Architecturally the packet transport network is formed of logical packet transport buses that are configured in the network for transport of packets to one of the nodes of the network from the other nodes of the network. Each logical packet transport bus is dynamically channelized to create an adaptive full mesh connectivity among the nodes in the network, such that the capacity of each connection in the mesh is continuously optimized according to real-time inbound traffic patterns at the packet transport network, thereby globally optimizing the throughput of the network. The dynamic channelization of each bus is done under the control of its destination node based on the demand for transport capacity towards it presented by the individual nodes in the meshed packet transport network.

8 Claims, 5 Drawing Sheets

SYSTEM AND METHOD FOR MAXIMIZING THE TRAFFIC DELIVERY CAPACITY OF PACKET TRANSPORT NETWORKS VIA REAL-TIME TRAFFIC PATTERN BASED OPTIMIZATION OF TRANSPORT CAPACITY ALLOCATION

BACKGROUND OF THE INVENTION

This invention pertains to the field of digital communications systems, particularly to the field of packet transport networking.

List of Acronyms:

| | |
|---|---|
| CDMA | Code Division Multiple Access |
| EOL | End-of-line |
| IP | Internet Protocol, IETF RFC 791 |
| POS | Packet-Over-SDH/SONET; used here as to refer any cell, frame or packet based transmission of data over SDH/SONET |
| PPP | Point-to-Point Protocol, IETF RFC 1661 |
| SDH | Synchronous Digital Hierarchy, ITU-T Recommendations G.707 and G.783 |
| SONET | Synchronous Optical Network |
| TDM | Time Division Multiplexing |
| TCP | Transmission Control Protocol, IETF RFC 793 |
| WDM | Wave-length Division Multiplexing |

Communication networks today contain packet-switching nodes and circuit-switching transport networks to interconnect the packet-switching nodes. The basic network topology alternatives to interconnect a group of packet-switching nodes that have a substantial amount of data traffic to interchange with each other are full-mesh, packet-ring and star. From the point of view of transporting a packet from one of the interconnected nodes to another one, i.e. from a source node to a destination node among the group of interconnected nodes, these basic alternatives can be defined as follows:

Full-mesh (later also mesh) topology is a transport network that provides direct any-to-any connectivity among the interconnected nodes, i.e. a network where there is a dedicated interconnect path between any pair of the nodes with no intermediate packet-switching nodes along such interconnect paths.

Packet-ring (later also ring) is a network where every one of the interconnected nodes on the ring along the path of a packet between its source and destination node is an intermediate packet-switching node.

Star is a topology where there is always a single intermediate packet-switching node between any pair of source and destination nodes. Unlike the mesh and ring topologies, the star topology requires adding a new packet-switching node (the hub-switch) to the network in addition to the packet-switching nodes interconnected by the network.

Since every instance of packet-level processing and/or switching along a route of a data packet across a network (like e.g. the Internet) is a potential point of congestion, each intermediate packet-switch node increases the delay, delay variation and the probability of packet discard. Obviously these measures seriously degrade the performance and efficiency of the network both directly and also indirectly, since the communicating applications using e.g. TCP retransmit packets that were not acknowledgedly delivered on time, therefore a portion of network capacity is being wasted for forwarding packets that will not reach their destination in time and that need therefore to be resent. Thus the network efficiency and performance are inversely proportional to the density of packet-switching nodes (called the hop-count in Internet traffic) along the routes across it. Besides the efficiency and performance, also the network cost and scalability need to be considered. In particular, the total interconnect bandwidth requirement, the total port count, and the total amount of packet processing/switching capacity (called later simply packet processing capacity) need to be compared to determine the most cost-efficient packet transport network architecture.

To compare these network cost-efficiency measures, consider a number N [an integer] of packet-switching nodes, each having capacity of A [Gb/s] for interchange of packet traffic with the rest of the interconnected nodes. As it is with e.g. Internet traffic, the demand break-down for the interconnect capacity of A at a given node among the rest of the interconnected nodes may vary in time in an unpredictable and arbitrary fashion, from evenly distributed traffic loads to a case where e.g. the full traffic interchange capacity at a given node is demanded by only one of the interconnected nodes. However, fair sharing of capacity is also required whenever the combined demand for the egress capacity of any given node exceeds A. To support traffic of this nature, the basic network cost parameters with the mesh, ring and star topology alternatives are as follows:

Mesh:
Interconnect bandwidth requirement R [Gb/s] for N-node full-mesh with guaranteed throughput of A between any pair of nodes in the absence of competing demand for egress capacity at the egress node is: $R=N(N-1)A$.

(N−1) ports are needed at each node; the total port count P [an integer] is: $P=N(N-1)$.

Requirement for two-directional packet processing capacity per node is $(N-1)A$, i.e. the total full-duplex packet processing capacity C [Gb/s] in the N-node interconnect network is: $C=N(N-1)A$.

Ring:
The lack of destination-node-performed capacity allocation capability inherent to the packet rings requires that there is a dedicated pipe of A reserved for traffic from each node i.e. $R=NA$.

Two ports are needed at each node: $P=2N$.

Requirement for full-duplex packet processing capacity per node is $(2R+A)$. Clearly, R should be greater than A to reduce blocking. SDH/SONET signal rate hierarchy goes in steps of 4, and Ethernet rate hierarchy in steps of 10. Thus in minimum, the packet processing capacity requirement per node (assuming $R=4A$) is $2\times 4A+A=18A$ i.e. in total $C=18NA$. In case there was a method to size the ring bandwidth to its theoretical minimum $R_{min}=((N-1)/2)A$, $C=N(N+1)A$.

Star:
A pipe of A is needed between each of the N nodes and both of the protected hubs i.e. $R=NA+NA=2NA$.

A protected hub of N ports is needed in addition to the N nodes: $P=2N+2N=4N$.

Total requirement for full-duplex packet processing capacity with a protected hub is: $C=NA+2\times NA=3NA$.

The above comparison is summarized in the below table:

| Cost Factor | Mesh | Ring | Star | Ideal |
|---|---|---|---|---|
| Interconnect bandwidth (R) | N(N − 1)A | (N − 1)A/2 | 2NA | (N − 1)A/2 |
| Port count (P) | N(N − 1) | 2N | 4N | 2N |
| Packet proc. cap (C) | N(N − 1)A | N(N + 1)A | 3NA | NA |
| Max packet processing capacity requirement for the interconnect traffic per a single node | (N − 1)A | (N + 1)A | NA | A |
| Aver. number of packet-switching instances | 1 | N/4 | 1 | 1 |
| Cabling (fiber or wavelength miles)* | N(N − 1)L/4 | L | NL/4 | L |

*as a function of the perimeter L [km] of a 2-fiber ring routed through the sites of the nodes to be interconnected From the above table it can be seen that many of the key network cost factors bear $O(N^2)$ dependency for the number of interconnected nodes, i.e. present the so called N-square scalability problem where a particular cost-measure grows according to the second power of the number of interconnected nodes. Comparable to the N-square scalability problem are cost factors with $O(N \times A)$-dependency, i.e. cost factors that grow according to the product of the traffic exchange capacity (A) per a node and the number of nodes (N). These major factors limiting cost-efficient scalability of networks, per topology class, are:

The mesh topology has the N-square scalability problem associated with all cost measures but the density of packet-switching instances.

The packet ring has an N-square dependency associated with the packet processing capacity requirement.

The maximum packet processing capacity per a single node-requirement with all the basic topologies grows according to the product of the number of nodes (N) and the traffic exchange capacity per node (A).

The 'Ideal' model is included in the comparison as a reference to show how the traditional alternatives deviate from the theoretical optimum interconnect network, which is implementable according to the innovation description of this patent application. It appears that the implementable theoretical optimum interconnect network minimizes the all the cost measures to less than or equal to those of the traditional topology alternatives, and, in particular, removes all the N-square dependencies and significantly reduces the linear N-dependencies. The deviation of the cost factors of the basic topologies from the Ideal reference is shown in the below table, in which the entries are the cost factor equations of the basic topologies divided by the corresponding Ideal reference equations:

| Cost Factor | Mesh:Ideal | Ring:Ideal | Star:Ideal |
|---|---|---|---|
| Interconnect bandwidth (R) | 2N | Round-up to the closest available ring rate | 4N/(N − 1) |
| Port count (P) | (N − 1)/2 | 1 | 2 |
| Packet proc. cap (C) | N − 1 | N + 1 | 3 |
| Max packet processing capacity requirement for the interconnect traffic per a single node | N − 1 | N + 1 | N |
| Aver. number of packet-switching instances | 1 | N/4 | 1 |
| Cabling (fiber or wavelength miles)* | N(N − 1)/4 | 1 | N/4 |

Based on the above comparison of traditional topology alternatives, an ideal network providing interconnectivity for a group of packet-switching nodes can be characterized as a system that:

For best performance, shall provide protected non-blocking fully meshable interconnectivity without introducing intermediate packet-switching instances along the paths of packets across the interconnect network;

For most efficient interfaces at the interconnected nodes, shall appear to the interconnected nodes as if they were interconnected using a single hub in star topology; and To provide protected connectivity with minimum required cabling and transport capacity, shall be able to be implemented using a dual-fiber ring physical topology with the theoretical minimum ring interconnect bandwidth of $R = ((N-1)/2)A$.

It is obvious that with the traditional topology alternatives, which are based on non-adaptive connections, the ideal inter-connect network model is not feasible. It is however not theoretically impossible to realize an embodiment of the above ideal model such that:

Is a distributed version of the hub of the star topology so that the interface units of the thus distributed hub-switch are located along the fiber ring that interconnects the packet-switching nodes; and Provides fall-mesh interconnectivity over the fiber ring among the aforesaid interface units with real-time optimization of allocation of the block (A) of the ring transport capacity reserved for transport of data towards each one of the interface units.

Obviously innovative system theory and architecture and novel signaling schemes and algorithms are required in order to realize an embodiment of the ideal interconnect network model. In particular, a novel control scheme is required for performing the network-scope real-time traffic-load-adaptive transport capacity optimization function necessary to provide full-mesh connectivity without creating N-square interconnect bandwidth requirement problem. It in particular is this novel real-time mesh connection control scheme that enables implementing an embodiment of the above characterized ideal interconnect network, and that differentiates the present invention from prior art. With conventional technologies, even connections that carry variable-bandwidth packet traffic have to be provisioned by the network operator, whereas the present innovation provides an automatic algorithm for real-time traffic-load-driven capacity allocation and connection modification process that continuously maximizes the network throughput.

Since the traditional alternatives are significantly less cost-efficient than the ideal model, especially for higher number of interconnected packet-switching nodes, there clearly is an increasing demand for networks that are close to the above described ideal model. This demand is created especially by the ongoing expansion of the Internet, including rapid growth in the number of Layer 3/2 (IP, MPLS.

Ethernet etc) routers/switches that need cost-efficiently scalable high-performance interconnectivity.

BRIEF SUMMARY OF THE INVENTION

The invention presented herein enables combining the benefits of mesh, ring and star network topologies for packet transport while avoiding the downsides of all of them. Namely, the invention enables combining the throughput and performance of mesh topology with the protection and cabling efficiency of ring, while avoiding the N-square scalability problem associated with meshes and the packet processing inefficiency of rings. The invention enables distributing the hub-switch of star topology as its individual interface units placed at optimal locations along e.g. a fiber ring, and providing direct full-mesh connectivity among the interface units of the thus distributed star-switch with real-time traffic-load based connection capacity optimization, thereby continuously maximizing the global throughput of the network of given resources.

BRIEF DESCRIPTION OF DRAWINGS

Symbols and Notations Used in the Drawings:
Lines between nodes, the nodes drawn as boxes, in the drawings represent a logical communication path, and may physically consist of one or more physical wires. When no direction is indicated, a line between nodes or boxes in the network diagrams presents a two-directional communication path.
While solid arrows indicate regular data traffic flow, gapped arrows indicate flow of system internal control information.
Bold lines indicate bussed communication paths, i.e. communication paths shareable by traffic flows from either various sources or to various destinations within the reach of the bus.
Lines crossing in the drawings are decoupled unless there is an oblique square at the junction of the crossing lines, in which case the crossing lines form a joint connection. Arrows ending into or beginning from a bus (a bold line) represent joining or disjoining of a sub-flow of data or control traffic into or from the bus, respectively.
The cloud shapes such as those above the packet-switches 2 in FIG. 1 present an abstraction of a physical sub-network.
A continuing array of repeating elements, such as packet-switches 2(a), 2(b) etc.

FIG. 1 illustrates a generic context of the network system 1, the subject matter of the present invention: the objective of network system 1 is to provide optimized interconnectivity among the packet switching network elements 2(a) through 2(z) surrounding it.

FIG. 2A presents the topology at the Layer 3 i.e. at the network layer, which is star topology; FIG. 2B presents the Layer 2 i.e. link layer topology, which is full-mesh; and FIG. 2C the simplest robust Layer 1 i.e. physical layer topology, which is a dual-fiber ring. The applicable protocols could be e.g. IP or MPLS at the network layer, PPP at the link layer, and SDH at the physical layer.

DETAILED DESCRIPTION OF THE INVENTION

General

The network system 1 provides non-blocking full-mesh adaptive interconnectivity among the packet-switching network elements 2 it interconnects, so that the global throughput of the interconnect network 1 is continuously maximized.

Since the preferred concrete embodiment of the network system 1 depends on the detail nature of its application, and due to the flexibility of the invented system regarding its physical partitioning and the network topologies, no single generic concrete embodiment of the present invention can be described without a detailed set of assumptions that defines its application. Thus, for the sake of understandability of this detail description, a relatively simple basic application of interconnect of packet-switches over a fiber ring is assumed herein for which the following description of the preferred embodiment particularly applies to.

Description of Preferred Embodiment

Figure 1:
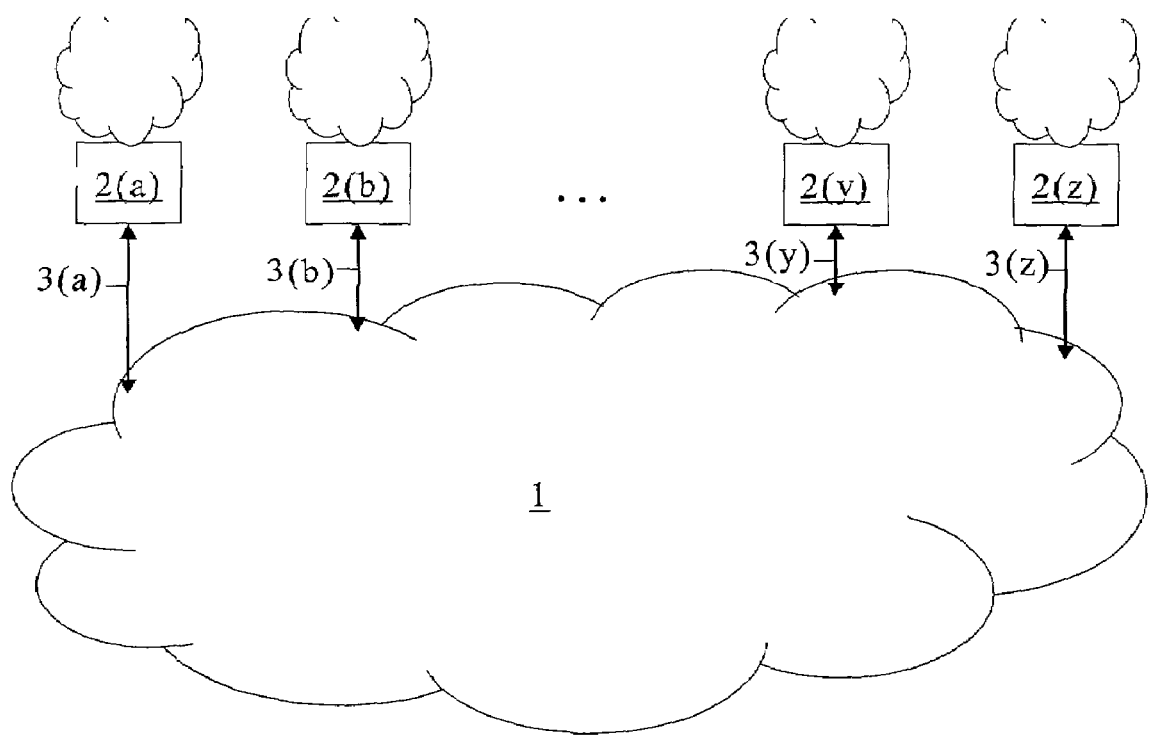
in FIG. 1 is marked with notation [ . . . ] placed in between of the drawn elements of the array.
A dotted line marks a border of a group of drawn elements that form a logical entity, such as the network system 1 in FIG. 2.B and FIG. 2.C and the fiber ring 7 in FIG. 4.
Figure 2:
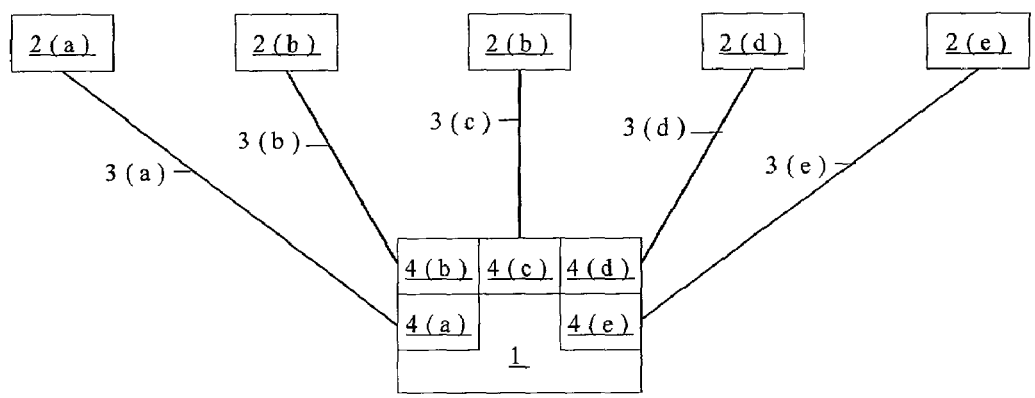
FIGS. 2A, 2B and 2C present the views of an instance of the network system 1, outlined in FIG. 1, here interconnecting five packet-switches 2(a) through 2(e), at different abstraction layers of network.
Figure 2:
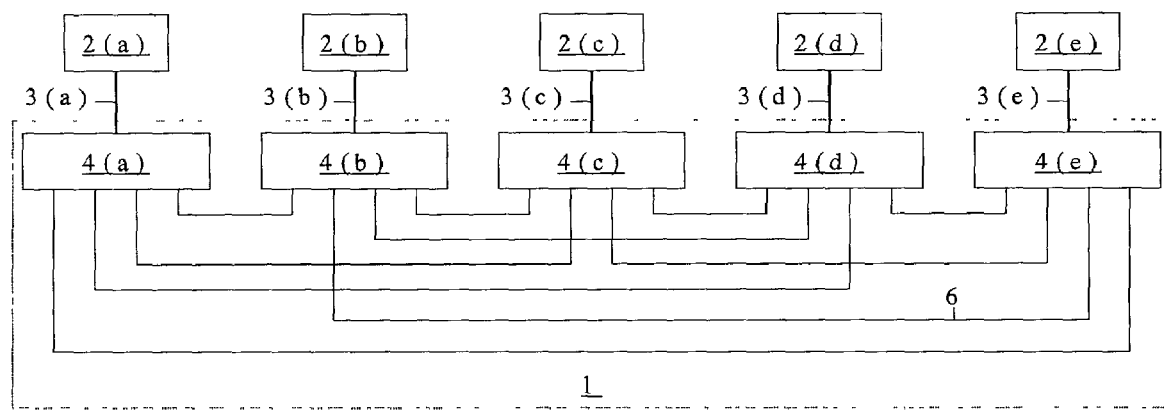
Figure 2:
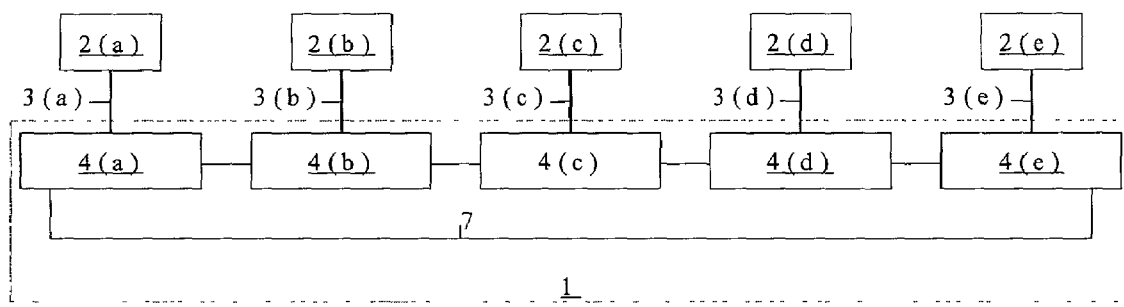

The assumed application for the invention for which the herein described preferred embodiment applies to can be briefly described as follows:
Five packet-switching nodes, 2(a), 2(b), 2(c), 2(d) and 2(e), are to be interconnected by the network system 1, the subject matter of the present invention, as shown in FIG. 1 and FIG. 2. The number of interconnect packet-switches was chosen as five as it is the smallest number of nodes where all the essential characteristics of the network system 1 become fully visible.
Each of the five packet-switches 2 has a single PPP backbone link 3 through which it exchanges the traffic with the other four packet-switches of FIG. 2.

In concrete terms, the currently preferred embodiment of the network system 1 for the above application consists of five interface units 4, one interfacing with each of the five packet-switches 2 interconnected by the network system 1. An interface unit interfaces with its associated packet-switch over an intermediate regular non-adaptive PPP link 3. These regular non-adaptive PPP links 3 between the packet-switches 2 and the interface units 4 of the network system 1, which appears to the packet-switches 2 as a single virtual hub-switch, are the only links in the network system 1 that are visible to the network layer, as seen in the network layer view of the network system FIG. 2A. At the link layer, the five interface units 4 of the herein preferred embodiment of the network system 1 connect with each other using adaptive PPP-like links 6 in a fully meshed manner as seen in the link-layer view of the network system FIG. 2B. Physically, in the preferred embodiment of the present invention for this application, the interface units are connected together over a fiber ring 7 so that each interface unit 4 appears as a node in the ring.

Dataflow through the Network System 1:

The operation of the network system 1 is herein described from the point of view its primary function, which is transport of packet data between the packet-switches 2 it interconnects. The elementary steps associated with transporting a packet of data from an ingress interface unit to a set of egress interface units (which can be zero, one or more, including all, of the interface units) of the network system comprise:

1. As the packet arrives over the PPP link 3 to an interface unit 4 of the network system 1, this ingress interface unit classifies the packet to assign it with a proper set of egress or destination interface units to where the packet is to be forwarded and potentially also a priority class.
2. The ingress interface unit writes the packet to a set of egress interface unit-associated buffers, corresponding to the set of egress interface units to which the packet is being forwarded to. Each such buffer may contain logical segments for packets of different priority classes.
3. From each such a buffer individually, the ingress interface unit maps the packet, when the priority segment to which it was written to is scheduled to be served, to a connection 6, an adaptive PPP link, that transports data to the egress interface associated with the buffer.
4. Each egress interface unit to where the packet is transported multiplexes the packet, among with other packets transported to the interface unit, via their own ingress interface unit-associated connections, to the egress-direction PPP link 3 of that interface unit.

Traffic Loads and Capacities Associated With the Mesh Connections:

Assuming the traffic patterns in the application considered herein is alike to those of the current Internet, the momentary traffic loads among the packet-switches 2 interconnected by the network system 1, i.e. the capacity demands associates with each of the mesh connections 6 across the network system 1, vary in time in an unpredictable manner. Still, the current transport network technologies are able to provide only connections with non-adaptive capacity with coarse granularity grid. E.g. the currently most common transport network technology SONET only offers STS-Nc (N=1,3,12,48,192; N non-adaptive) POS links with capacities of roughly N×50 Mpbs i.e. with rigid 0.05/0.15/0.6/2.4/9.6 Gbps granularity. The second most common alternative to POS, Ethernet technology offers even coarser, 0.01/0.1/1/1 Gbps link rate granularity with no channelization capability. It is evident that such non-adaptive transport connections with a coarse granularity grid result in far-from-optimal network cost-efficiency: if even one of the connections gets overloaded, it creates a radiating congestion in the network and degrades the network throughput; on the other hand, over-engineered connection capacities result in poor utilization of the costly network resources. It is however only the present invention that provides a general purpose packet transport network technology with traffic load-adaptive-connections, which result in maximization of the network global throughput.

The adaptivity of the mesh connections 6 relates to the property of them such that the transport capacity of each such connection in the network system 1 is dynamically adjusted by the destination interface unit of each connection so as to continuously match the traffic load i.e. transport capacity demand associated with each connection, in order to maximize the global data throughput of the network system 1, via real-time optimization of the utilization of the egress capacity i.e. egress PPP link 3 of each interface unit.

Figure 3:
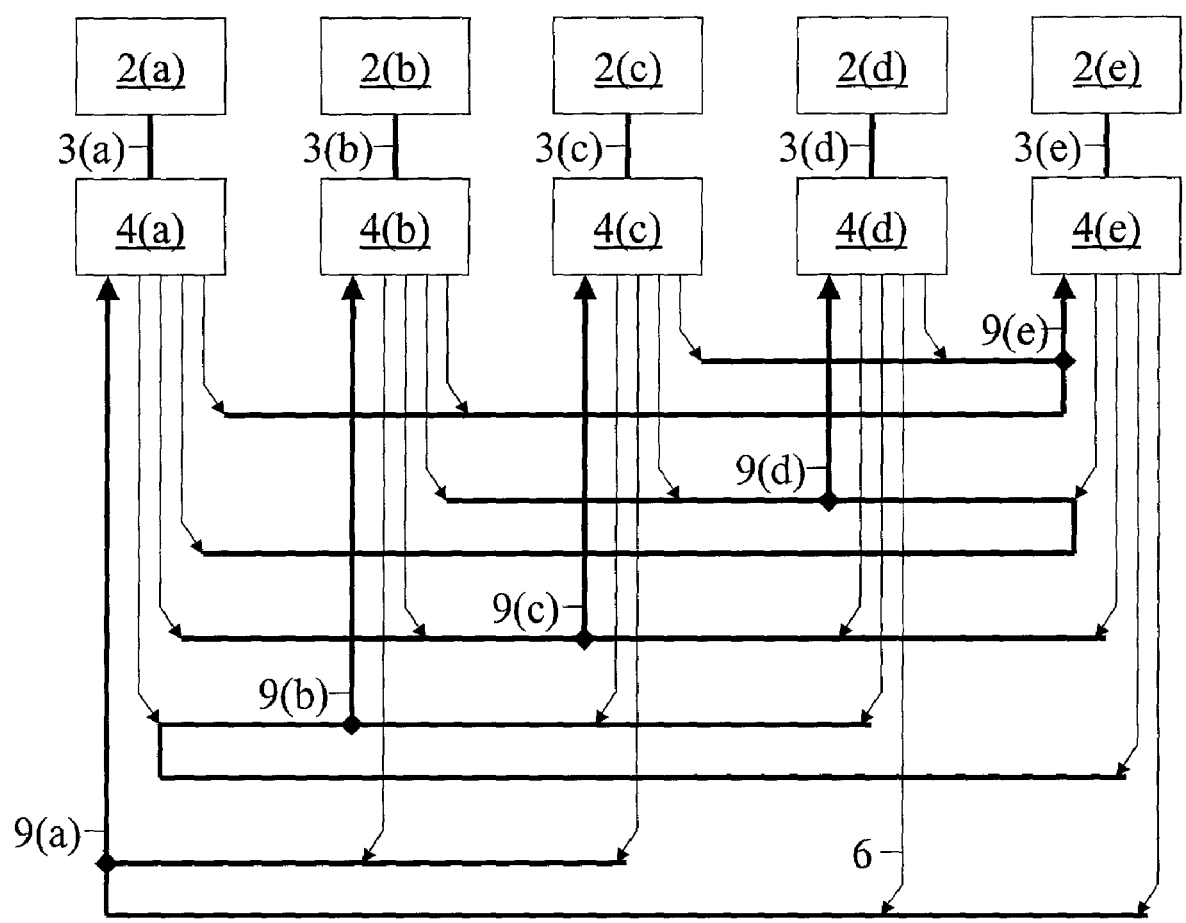
FIG. 3 illustrates the five logical packet transport 4:1 multiplexer buses, 9(a) through 9(e), providing the non-blocking full-mesh link-layer interconnectivity, as per FIG. 2B, among the interface units 4(a) through 4(e), and thereby also among the packet-switches 2(a) through 2(e), which however see the network system through their unchannelized point-to-point links 3 as a single star switch, as per FIG. 2A.

Packet Transport Multiplexer-Bus-Model of the Five-Node Interconnect Network:

The five-packet-switch-interconnect network system 1 with the five-packet-switch-interconnect network system 1 with adaptive intra-system PPP links 6 as shown in FIG. 2B can modeled as five independently operating but functionally alike 4:1 logical packet transport multiplexer-buses $9(a)$, $9(b)$, $9(c)$, $9(d)$, $9(e)$, as presented in FIG. 3.

Figure 4:
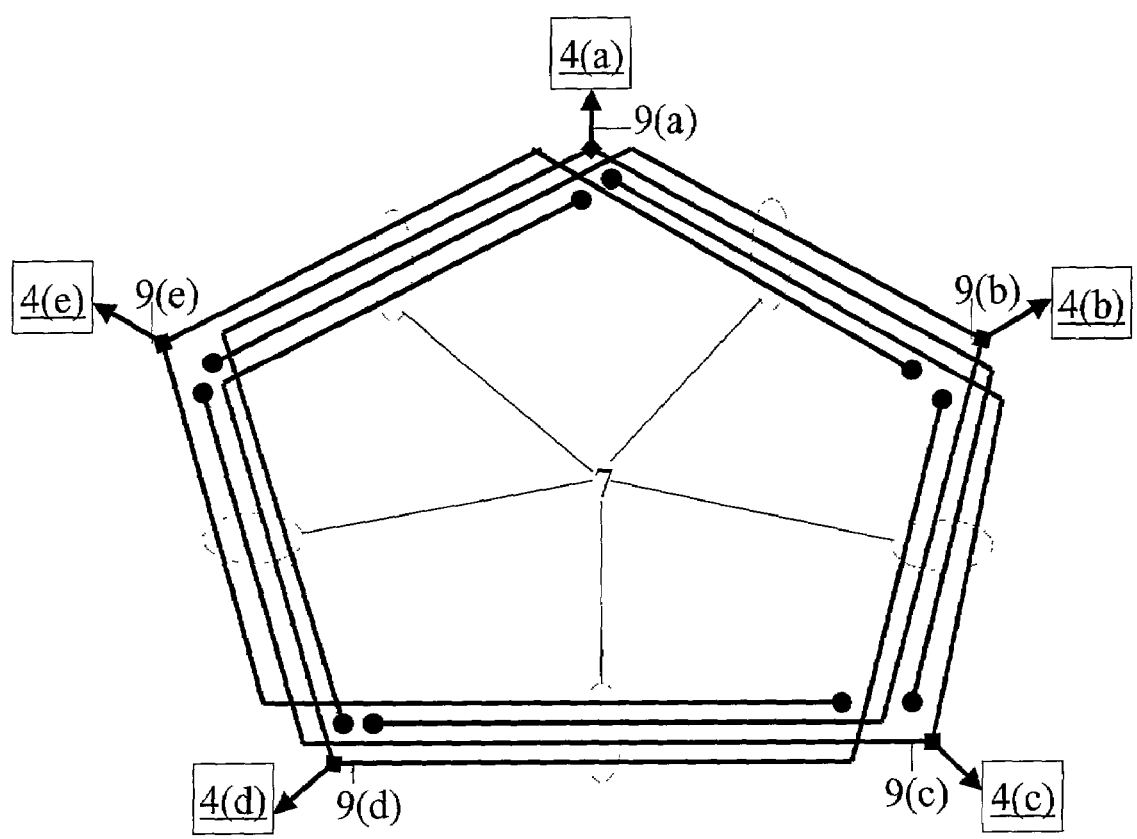
FIG. 4 illustrates the five logical buses 9 of FIG. 3, as when physically routed in a dual-fiber ring 7, as per FIG. 2C.

From FIG. 4 it can be seen that the fiber ring interconnect bandwidth requirement R [Gb/s] between any pair of interface units 4 per ring direction in a network system 1 with N [an integer] interface units, with average capacity of the PPP links 3 of the interface units of A [Gb/s], is given by the equation $R=((N-1)/2)A$, as $((N-1)/2)$ number of buses with average bandwidth A capacity will need to be routed on any ring 7 hop from an interface unit 4 to its adjacent one. This is a drastic reduction from what would be required to implement equal mesh connectivity with conventional technologies, as with conventional non-adaptive PPP links with average requirement for available capacity of A between any pair of nodes in the N-node mesh configured over a fiber ring the ring bandwidth requirement would be $R=N(N-1)A$, as each of the N nodes will need to terminate (N−1) point-to-point links with average bandwidth of A per link. In particular, it is seen in FIG. 4 that in this five-node ring 7 two buses 9 of bandwidth A [Gb/s] each need to be routed on the fiber ring per ring direction, i.e. the transport bandwidth requirement for the dual-fiber ring is $R=((5-1)/2)A=2A$ per direction; while a conventional non-adaptive but otherwise equal full-mesh over a dual-fiber ring would require $R=N(N-1)A=5(5-1)A=20A$ of transport bandwidth per ring direction, i.e. ten times more bandwidth than what is needed when utilizing the present invention.

Each one of the five multi-source single-destination buses 9 operates independent from each other but according to same operation principles, and therefore we will take one, be it $9(c)$, of these buses for detail study. Like all the other buses $9(a)$ through $9(e)$, the bus $9(c)$, presented alone in FIG. 5, has an egress interface unit e.g. a destination node 10, and a number of ingress interface units 11 i.e. source nodes $11(a)$, $11(b)$, $11(d)$ and $11(e)$ that are able to transport data on the bus 9 to its destination node 10. The bus 9 has two branches 12: the source nodes $11(a)$ and $11(b)$ are on one branch 12, called herein the West-branch $12(a)$, while the other source nodes $11(d)$ and $11(e)$ are on the another, the East-branch $12(b)$ of the bus 9. The nodes $11(a)$ and $11(e)$ are the end-of-line (EOL) nodes 13 of their branches 12: the node $11(a)$ is the EOL node $13(a)$ to the West-branch, and the node $11(e)$ is the EOL node $13(b)$ to the East-branch.

Operation of a Packet Transport Bus:

The control process of each bus 9 is cyclic i.e. has a process cycle that is of fixed duration under normal operation. The process cycle timing is based on timers at each interface unit 4, also referred to as nodes, depending on the context. The timer counts a specific number of its operating clock periods corresponding to the duration of one data transfer slot on the bus, and thereupon counts a specific number of these bus transfer slots that constitute a complete bus process cycle, and then resets itself to time a subsequent bus process cycle, and so on. The timer is further able to count a certain number of these bus process cycle times to keep a cycle sequence count, which also rolls over as the cycle count has reached the maximum value of the sequence counter.

By keeping these transfer slot and cycle counts at the nodes regarding a given bus that these nodes access synchronized to each other with at least the transfer slot count level, the nodes are able to access the buses mutually synchronized and thus realize hitless (i.e. data-loss-free) switching of the adaptive connections 6, even across multiple nodes with independent node operating clocks, which however are required to have the same nominal frequency and comply to general characteristics required for telecom equipment clocks. Having a cyclic bus capacity allocation process with constant process cycle also guarantees fixed control process response time that is necessary to properly serve delay and jitter sensitive traffic. The total amount of data transfer slots on each bus is allocated among its source nodes to use for every bus process cycle based on the capacity demand of the source nodes towards the destination node of the bus, which process ensures that the total bus transport capacity, i.e. the egress capacity of the destination interface unit of the bus, is always optimally utilized.

The transfer slots on a logical bus 9 can be mapped to whatever type of means the bus provides for time, space or frequency division of its data transmission capacity. Depending on the transmission media used to construct the logical bus 9, the bus data transfer slots can be mapped to for example to timeslots of a TDM signal or wavelengths of a WDM signal. In any case, a bus data transfer slot is a fixed amount of data transport capacity, typically measured in data bytes, during the process cycle, and it serves as the unit for bus capacity allocation and facilitates space- and/or time-sharing the bus transport capacity among its source nodes.

In the network system 1 each node is an EOL node for two bus branches (these branches belonging to two different buses) as illustrated in FIG. 4, where a black ball at end of a bus line denotes the location of the EOL node of the bus branch. The EOL source nodes 13 are the synchronization masters for their associated bus branches. Each node 4 thus has a free-running timer that is the synchronization master for the bus branches to which the node is an EOL node. In addition, each node has a slave timer for each bus 9 it accesses, other than of course for those buses for which the node is an EOL node. The nodes keep these slave-timers synchronized to the local cycle phases of their associated buses so that all the nodes along the bus branch access it mutually synchronized.

Figure 5:
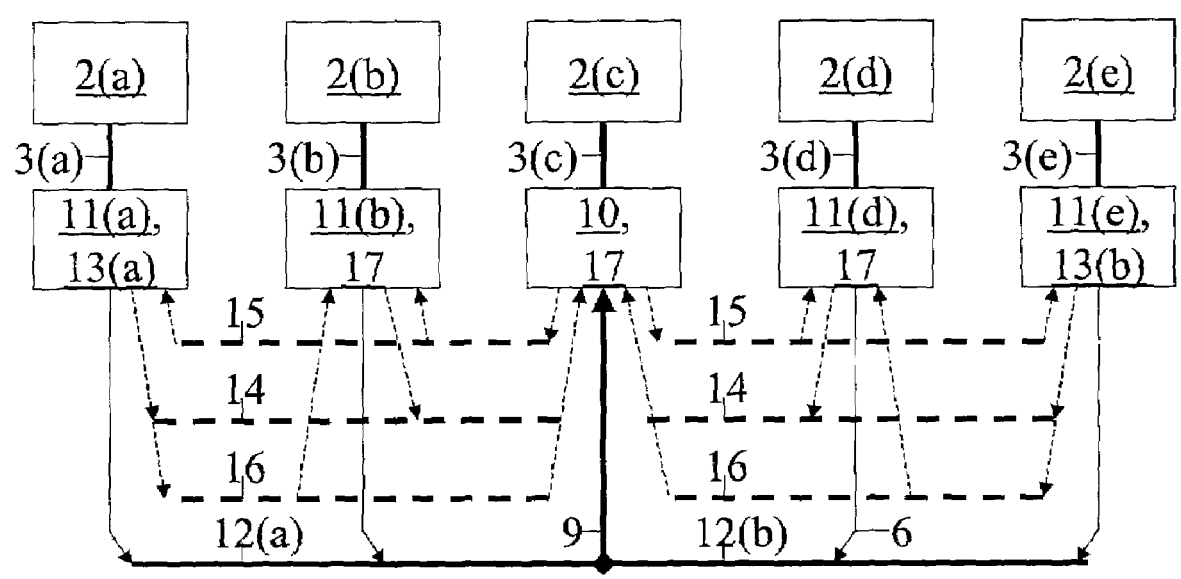
FIG. 5 illustrates the bus control information flows associated with one of the 4:1 logical packet transport multiplexer buses shown in FIG. 3.

The signaling associates with the control of a bus 9 in the network system 1 consist of three basic control information flows as depicted in FIG. 5 and listed below:

1) Bus transport capacity demand info 14 from the source nodes to the destination node.
2) Capacity allocation info 15 from the destination node to the source nodes.
3) Bus branch synchronization 16 from the EOL nodes to the downstream nodes 17 along the branch of the bus.

These information flows are implemented in the currently preferred embodiment as follows:

1) Each node 4 distributes its transport capacity demand info 14, as a number of requested bus transfer slots per a process cycle towards each individual node in the network system 1, for the other nodes in the network system once every process cycle.
2) Each node computes an optimized capacity allocation pattern for its egress PPP link 3 i.e. transfer slot allocation for the logical bus 9 to which it is the destination node 10, for the next bus process cycle, among the source nodes 11 of the bus based on the set of most recently received transfer slot requests 14 from the source nodes. The node distributes this capacity allocation info 15 for the next process cycle for the bus to which it is the destination node 10, as source node-specific transfer slot allocation tables, for the other nodes 11 in the network system 1 once every process cycle.
3) Each node includes both its capacity demand info 14 and capacity allocation info 15 in the same special and identifiable transfer frames called herein as control frames, and transmits these control frames in specific transfer slots on every process cycle, according to its local free running process cycle timer, to the downstream nodes 17 along the branches 12 of the buses 9 to which the node is an EOL node 13. The specific numbers of the transfer slots reserved for this bus control information exchange are global to the network system 1 and thus known by every node 4, and therefore never allocated for data transport. Since this control frame transfer occurs at a constant phase on every bus process cycle, and since the control frames are identifiable by the downstream nodes along the bus via a special header pattern at them, they also convey the process cycle synchronization 16 from the EOL nodes 13 to the downstream 17 nodes along the branch 12 of the bus 9.

Each transfer slot allocation table 15 delivered on the bus carries an incrementing and rolling over cycle sequence count attached to it marking the sequence order of the coming bus process cycles on which the transfer slot allocation table is to be applied. Similarly, the bus branch cycle sync info 16 carries a cycle sequent count identifying the process cycle sequence number of the transfer slot allocation table which the EOL node will be applying on the next bus process cycle. These cycle sequence counts allow the nodes along the branch of the bus to apply the (potentially stacked, due to the transmission latency experienced by the control information of the bus) transfer slot allocation tables in mutual synchrony, even if the interface units 4 of the network system 1 were thousands kilometers apart.

Optimization of the Packet Transport Network Throughput:

Since the network system 1 is logically constructed of independently operating but functionally alike multi-source single-destination buses 9, maximization of the global throughput of the packet transport network system 1 is achieved by maximizing the utilization of each of its logical packet transport buses 9 individually. The process of maximizing the utilization of a single bus, e.g. 9(*c*), and thereby its associated the egress PPP link 3(*c*) consists of two sub-processes:

Quantifying the demand for bus transport capacity for the next bus process cycle by each individual source node 11 of the bus 9; and Allocating the bus transport capacity for the next process cycle based on the set of newest demand info 14 presented individually by the source nodes 11 of the bus 9.

The demand quantification sub-process is carried out in the herein preferred embodiment of the present invention by the following algorithm: The amount of data bytes in a buffer i.e. the fill of a buffer at the source node 11 is sampled at a constant phase on every process cycle. A number of buffer fill threshold values with associated minimum capacity demand figures are configured by system software to the nodes 4. The inbound data rate to the buffer i.e. the volume of the associated traffic flow (that is to be mapped to its corresponding mesh connection 6) during the most recent process cycle period is computed by adding the amount of data read from the buffer during the that process period i.e. between the two most recent buffer fill sampling moments to the latest fill sample, and by subtracting from that sum the previous buffer fill sample. If the inbound data rate during the previous process cycle period corresponds to a bus transport capacity value greater than the minimum capacity demand figure associated with the highest threshold the most recently sampled buffer fill exceeds, the bus capacity demand of the node is translated from the inbound volume of the associated flow, otherwise it is the minimum capacity demand figure based on the fill of the buffer.

The bus transport capacity allocation sub-process is based in the currently preferred embodiment on the following algorithm: The bus transfer slots on the new process cycle are allocated in a round-robin fashion, starting at every process cycle from a new source node in a revolving order, one slot at a time per each source node whose requested amount of transfer slots had not been met yet, until either the full cycle-worth of transfer slots have been allocated to the source nodes (11(a), 11(b), 11(d) and 11(e) in case of the bus 9(c)), or until the transfer slot request figures of all the source nodes 11 have been met, after which any unallocated transfer slots are allocated evenly across all the source nodes of the bus.

Mapping the Invention Principles to SDH/SONET Technology:

The principles of the present invention described in the foregoing can be implemented with various CDMA, TDM and WDM data transmission technologies. Currently the most common transport network technology is the TDM-based SDH, of which SONET is a subset used in North America. A mapping of the principles of the present invention to SONET technology is provided here in as follows.

Bus 9 can be implemented as group of STS-1s, this group of M [an integer] STS-1s called herein as an STS-M bus, routed from the EOL nodes 13 of the branches 12 of the bus through the downstream nodes 17 along the branches of the bus to the destination node 10 of the bus. The data transfer slots on the STS-M bus are most naturally STS-1 time slots on it. The adaptive intra-system PPP links 6 are formed as virtual concatenation of the STS-1 slots allocated for a given time for the connection from a source node 11 to the destination node 10 of the bus 9. If X [another integer no greater than M] STS-1 slots are allocated on a given transfer slot-time for the connection 6 from a particular source to the destination node of the bus (out of the M STS-1 slots total on the bus), the source node is said to have an STS-Xv SONET connection to the destination node. Thus each interface unit 4 of the network system 1, assuming it uses SONET as the data transmission media, is able to perform dynamic ingress interface unit-wise STS-Xv channelization of the STS-M bus configured for data transport towards it from the remote interface units of the network system 1. Using the SDH standard notation an STS-Xv equals an S3-Xv path, or VC-3-Xv transmission payload.

The duration of a data transfer slot, and thereby also the duration of the bus process cycle, in case the network system 1 is based on SONET, are thus naturally integer multiples of SONET frame periods. The SONET frame period is nominally 125 microseconds.

Thereby the control frames carrying the capacity demand info 14 by a node 4, the capacity allocation info 15 by that node, and the sync 16 of the branches of the bus to which the node is an EOL node, are herein mapped by the EOL nodes of the bus branches to a specific set of STS-1 frame slots, on a specific bus transfer slot, on a specific STS-1 channel of the STS-M buses, with the specific STS-1 frame slots, transfer slots and the STS-1 channel carrying the control frames from the EOL nodes to the downstream nodes on the bus branches known by all these nodes, so that the nodes along a bus branch can access the STS-M bus synchronized to each other, with one SONET frame period of maximum phase error margin.

Conclusion:

This detail description of the invention and the attached figures are to be regarded as illustrative rather than restrictive description of the present invention. It is obvious that various changes, substitutions, and alterations can be made in to the above detail described example embodiment without departing from the scope of the present invention, even if all of the advantages identified above are not present. For example, the system may be implemented using various combinations of software and hardware and differently partitioned sub-systems and sub-algorithms. Moreover, the methods, processes, process steps, techniques, systems and modules described and illustrated in the preferred embodiment as discrete or separate may be split in to sub-modules etc, and/or combined or integrated with other methods, processes, techniques, systems or modules without departing from the spirit and scope of the present invention as defined by the claims following.

What is claimed is:

1. A network system for interconnecting a set of packet-switching network elements, the network system comprising a set of nodes, each node configured to interface with one of the packet-switching network elements and providing a connection of variable capacity to the other nodes of the network system;

each one of the connections configured to transport data from its source node to its destination node and having an associated capacity and traffic load;

the capacity of each connection controlled directly and exclusively from its destination node based at least in part on the traffic loads associated with the connections configured to transport data to that destination node.

2. The network system of claim 1 wherein the system is configured to set the capacity of a connection to zero when the connection has no traffic load associated therewith and traffic loads associated with other connections to the same destination node cumulatively exceed a predefined limit.

3. The network system of claim 1 wherein the traffic loads and the capacities associated with the connections between the set of nodes are dynamic variables.

4. The network system of claim 1 where the capacities of the connections are cyclically optimized with a cycle time that is constant during regular system operation.

5. The network system of claim 1 wherein a number, up to all, of the nodes are physically located at a single physical platform or are attached to a single chassis.

6. The network system of claim 1 wherein one or more of the nodes are integrated into their associated packet-switching network elements.

7. The network system of claim 1 wherein the system is at least in part a sub-network of a multi-use or public network, with additional network elements, which do not actively participate in the operation of the thus created sub-network, in pass-through mode either in between the nodes or in between the packet-switching network elements and the nodes of the sub-network.

8. The network system of claim 1 wherein one or more of the packet-switching network elements interconnected by said network system is a network system.

* * * * *